United States Patent
Liang

(10) Patent No.: US 11,235,468 B2
(45) Date of Patent: Feb. 1, 2022

(54) ROBOT TEACHING PROGRAMMING METHOD, APPARATUS AND SYSTEM, AND COMPUTER-READABLE MEDIUM

(71) Applicant: Siemens Ltd., China, Beijing (CN)

(72) Inventor: Dong Liang, Beijing (CN)

(73) Assignee: SIEMENS LTD., CHINA, Beijing (CN)

( * ) Notice: Subject to any disclaimer, the term of this patent is extended or adjusted under 35 U.S.C. 154(b) by 258 days.

(21) Appl. No.: 16/520,476

(22) Filed: Jul. 24, 2019

(65) Prior Publication Data

US 2020/0030980 A1   Jan. 30, 2020

(30) Foreign Application Priority Data

Jul. 25, 2018   (CN) .......................... 201810829644.X

(51) Int. Cl.
*B25J 9/16*   (2006.01)
*B25J 13/08*   (2006.01)
*B25J 9/10*   (2006.01)

(52) U.S. Cl.
CPC ........... *B25J 9/1671* (2013.01); *B25J 9/1035* (2013.01); *B25J 9/1664* (2013.01); *B25J 9/1694* (2013.01); *B25J 13/088* (2013.01)

(58) Field of Classification Search
CPC ................. B25J 9/16; B25J 13/08; B25J 9/10
See application file for complete search history.

(56) References Cited

U.S. PATENT DOCUMENTS

2005/0240309 A1*  10/2005  Bischoff ............. G05B 19/427
                                                      700/245
2006/0195228 A1    8/2006  Igarashi
(Continued)

FOREIGN PATENT DOCUMENTS

CN      1824471 A    8/2006
EP      2753460 B1   12/2016
(Continued)

OTHER PUBLICATIONS

Extended European Search Report dated May 28, 2020.
(Continued)

*Primary Examiner* — Kira Nguyen
(74) *Attorney, Agent, or Firm* — Harness, Dickey & Pierce, P.L.C.

(57) ABSTRACT

In robot teaching programming, a robot teaching programming method, apparatus and system, and a computer-readable medium, can realize the programming of a robot simply, and are not restricted in terms of robot types. A robot teaching programming system includes a movable apparatus for imitating movement of an end effector of a robot in a working space of the robot; a robot teaching programming apparatus for recording first movement information of the movable apparatus in a first coordinate system and converting the same to second movement information in a second coordinate system of the robot, and then programming the robot according to the second movement information. Using a movable apparatus to simulate an end effector of a robot has the advantages of ease of operation, and no restrictions in terms of robot types. Teaching programming is accomplished through simple coordinate transformation, and there is no need for advanced programming skills.

6 Claims, 3 Drawing Sheets

(56) References Cited

U.S. PATENT DOCUMENTS

| | | | |
|---|---|---|---|
| 2007/0005189 A1* | 1/2007 | Furubo | G05B 19/427 |
| | | | 700/251 |
| 2010/0121487 A1* | 5/2010 | Kawaguchi | H01L 21/67742 |
| | | | 700/228 |
| 2016/0229062 A1* | 8/2016 | Suzuki | B25J 9/1697 |
| 2016/0243704 A1 | 8/2016 | Vakanski | |
| 2018/0043525 A1* | 2/2018 | Su | B25J 13/081 |
| 2020/0030980 A1 | 1/2020 | Liang | |

FOREIGN PATENT DOCUMENTS

| | | |
|---|---|---|
| EP | 3670108 A1 | 6/2020 |
| JP | H09193064 A | 7/1997 |
| JP | 2016013607 A | 1/2016 |
| WO | WO 2015058297 A1 | 4/2015 |

OTHER PUBLICATIONS

Chinese Office Action dated Sep. 1, 2020.
Extended European Search Report dated May 28, 2020 in European Application No. 19188117.6.

\* cited by examiner

ROBOT TEACHING PROGRAMMING METHOD, APPARATUS AND SYSTEM, AND COMPUTER-READABLE MEDIUM

PRIORITY STATEMENT

The present application hereby claims priority under 35 U.S.C. § 119 to Chinese patent application number CN 201810829644.X filed Jul. 25, 2018, the entire contents of which are hereby incorporated herein by reference.

FIELD

At least one embodiment of the present invention generally relates to the technical field of robot teaching programming, in particular to a robot teaching programming method, apparatus and system, and a computer-readable medium.

BACKGROUND

A robot is a machine, which is controlled by an external or internal control apparatus, thereby automatically completing a series of complex actions. In general, the actions completed by the robot are controlled by computer programs; the methods by which these computer programs are programmed may include but are not limited to the following three types:

1. Using the Teach Pendant Programming Method

This method uses function buttons on a teach pendant to drive each joint axis of the robot, completing the teaching programming of positions and functions according to sequential single-axis movements or multi-joint coordinated movement required by a job. This method is limited by operations on the teach pendant, which are complex; moreover, it is generally necessary to control multiple axes in a coordinated manner, increasing the complexity of programming.

2. The Lead Through Teaching Programming Method

In this method, in general, an end effector of the robot is led by a person through the required positions; at the same time, a sensor detects coordinate values at each joint of the robot, and this data information if recorded by a control system; the control system of the robot will reproduce the path which has been taught. Taking into consideration the safety and operating ability of the person, this method is generally only suitable for small robots.

3. Offline Programming

In this method, a user programs the robot in a simulated environment. The robot, the surrounding environment of the robot and all objects are mapped into the simulated environment. The user defines positions, paths and interaction with working objects in a virtual manner. The real robot then executes these instructions. When this method is used, the entire surrounding environment of the robot must be accurately mapped into the simulated environment, and this requires that the user have advanced programming skills.

In summary, some existing robot programming methods are difficult to operate, some have exacting requirements in terms of programming skills, and some are not suitable for all types of robot.

SUMMARY

In view of the above, embodiments of the present invention provide a robot teaching programming technology, which can realize the programming of a robot simply, and is not restricted in terms of robot types.

In a first embodiment, a robot teaching programming method is provided. The method may comprise: recording first movement information, the first movement information being information of a movable apparatus imitating movement of an end effector of a robot in a working space of the robot in a first coordinate system; determining second movement information according to a correspondence relationship between the first coordinate system and a second coordinate system, and the first movement information, wherein the second coordinate system is a coordinate system of the robot in the working space, and the second movement information is information of the movable apparatus imitating movement of the end effector of the robot in the second coordinate system; programming the robot according to the second movement information.

In a second embodiment, a robot teaching programming apparatus is provided, which may be used to implement the method provided in the first embodiment. The apparatus may comprise: a recording module, for recording first movement information, the first movement information being information of a movable apparatus imitating movement of an end effector of a robot in a working space of the robot in a first coordinate system; a conversion module, for determining second movement information according to a correspondence relationship between the first coordinate system and a second coordinate system, and the first movement information, wherein the second coordinate system is a coordinate system of the robot in the working space, and the second movement information is information of the movable apparatus imitating movement of the end effector of the robot in the second coordinate system; a programming module, for programming the robot according to the second movement information.

In a third embodiment, a robot teaching programming apparatus is provided, comprising:
  at least one memory, for storing computer-readable code;
  at least one processor, for calling the computer-readable code, and executing the method provided in the first embodiment.

In a fourth embodiment, a computer program product is provided, the computer program product being tangibly stored on a computer-readable medium and comprising a computer-executable instruction which, when executed, causes at least one processor to execute the method provided in the first embodiment.

In a fifth embodiment, a computer-readable medium is provided; a computer-readable instruction is stored on the computer-readable medium, and the computer-readable instruction, when executed by a processor, causes the processor to execute the method provided in the first embodiment.

In a sixth embodiment, a robot teaching programming system is provided, comprising: a movable apparatus, for imitating movement of an end effector of a robot in a working space of the robot; a robot teaching programming apparatus, for recording first movement information, the first movement information being information of movement of the movable apparatus in a first coordinate system; determining second movement information according to a correspondence relationship between the first coordinate system and a second coordinate system, and the first movement information, wherein the second coordinate system is a coordinate system of the robot in the working space, and the second movement information is information of the movable apparatus imitating movement of the end effector of the robot in the second coordinate system; programming the robot according to the second movement information.

Figure 1:
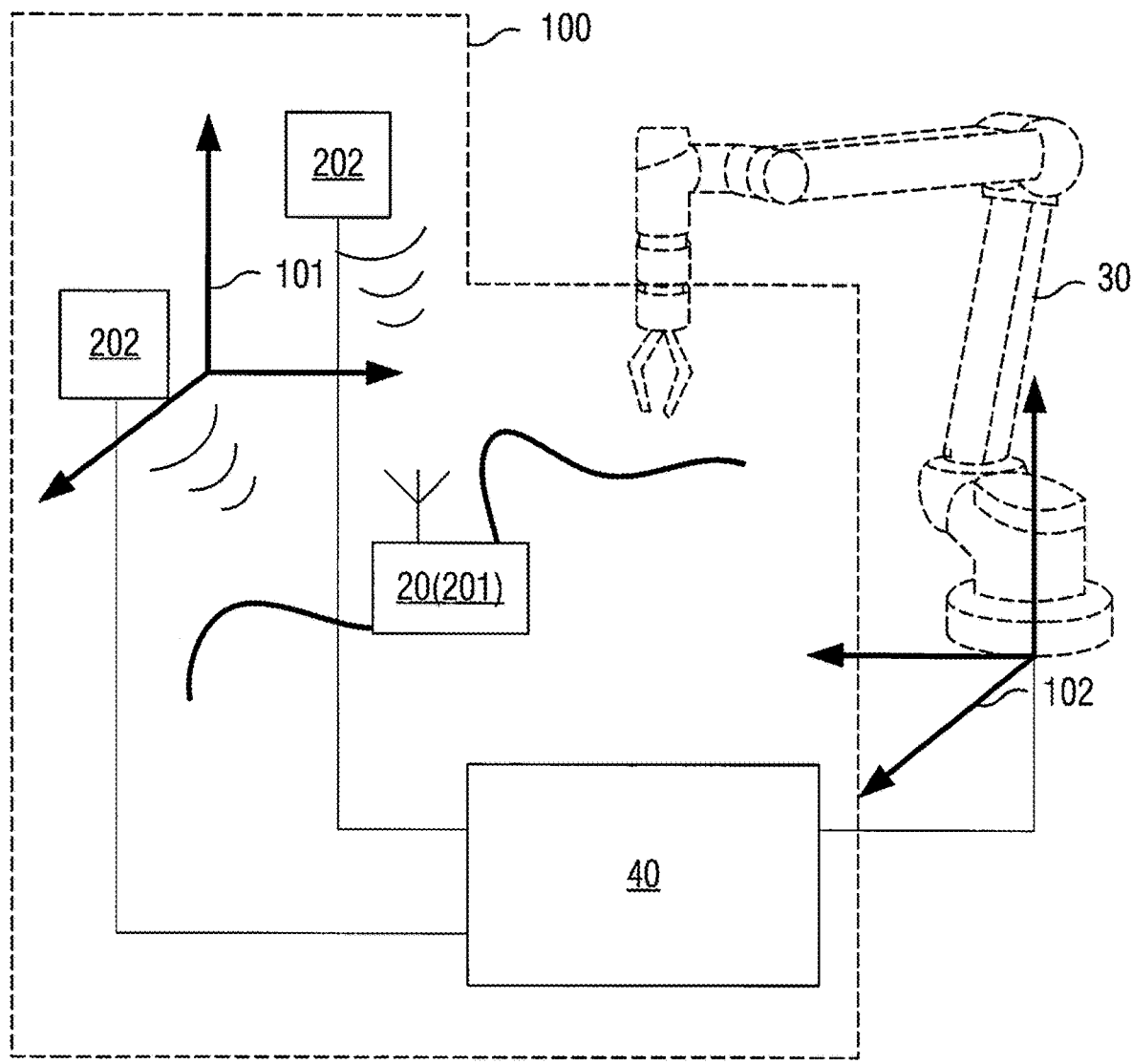
FIG. 1 is a structural schematic diagram of a robot teaching programming system provided in an embodiment of the present invention.

List of labels used in the drawings:
100: computer teaching programming system
20: movable apparatus
30: robot
101: first coordinate system
102: second coordinate system
201: signal receiver
202: signal transmitter
40: robot teaching programming apparatus
401: recording module
402: conversion module
403: programming module
404: memory
405: processor
$(X_1, Y_1, Z_1)$: position coordinates of movable apparatus 20 in first coordinate system 101
$(X_2, Y_2, Z_2)$: position coordinates of movable apparatus 20 in second coordinate system 102
$RYP_1$: attitude angle of movable apparatus 20 in first coordinate system 101
$RYP_2$: attitude angle of movable apparatus 20 in second coordinate system 102
S201: determining correspondence relationship between first coordinate system 101 and second coordinate system 102
S202: recording first movement information of movable apparatus
S203: performing coordinate transformation, determining second movement information according to first movement information
S204: programming robot 30 according to second movement information

DETAILED DESCRIPTION OF EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

As stated above, existing teaching programming techniques have disadvantages such as difficulty of operation, exacting requirements in terms of programming skills, and lack of suitability for all types of robot. In an embodiment of the present invention, a movable apparatus is used to simulate movement of an end effector of a robot, movement information of the movable apparatus is recorded, the recorded movement information is converted by coordinate transformation into movement information in a coordinate system of the robot, and the converted movement information is then used to program the robot. This has the advantages of ease of operation, and no restrictions in terms of robot types. Teaching programming is accomplished through simple coordinate system transformation, and there is no need for advanced programming skills.

In a first embodiment, a robot teaching programming method is provided. The method may comprise: recording first movement information, the first movement information being information of a movable apparatus imitating movement of an end effector of a robot in a working space of the robot in a first coordinate system; determining second movement information according to a correspondence relationship between the first coordinate system and a second coordinate system, and the first movement information, wherein the second coordinate system is a coordinate system of the robot in the working space, and the second movement information is information of the movable apparatus imitating movement of the end effector of the robot in the second coordinate system; programming the robot according to the second movement information.

A movable apparatus is used to simulate movement of an end effector of a robot, movement information of the movable apparatus is recorded, the recorded movement information is converted by coordinate transformation into movement information in a coordinate system of the robot, and the converted movement information is then used to program the robot. This has the advantages of ease of operation, and no restrictions in terms of robot types. Teaching programming is accomplished through simple coordinate system transformation, and there is no need for advanced programming skills.

Optionally, the movable apparatus comprises at least one signal receiver; in the method, when recording first movement information, the first movement information may be determined and recorded according to a signal received by the at least one signal receiver from at least one signal transmitter; and then in the method, the correspondence relationship between the first coordinate system and the second coordinate system is determined according to a relative positional relationship between the at least one signal transmitter and the robot. In this way, the correspondence relationship between the two coordinate systems may be determined according to the position of the deployed signal transmitter; this has the advantages of simplicity, ease of implementation, and flexibility of deployment.

In a second embodiment, a robot teaching programming apparatus is provided, which may be used to implement the method provided in the first embodiment. The apparatus may comprise: a recording module, for recording first movement information, the first movement information being information of a movable apparatus imitating movement of an end effector of a robot in a working space of the robot in a first coordinate system; a conversion module, for determining second movement information according to a correspondence relationship between the first coordinate system and a second coordinate system, and the first movement information, wherein the second coordinate system is a coordinate system of the robot in the working space, and the second movement information is information of the movable apparatus imitating movement of the end effector of the robot in the second coordinate system; a programming module, for programming the robot according to the second movement information.

A movable apparatus is used to simulate movement of an end effector of a robot, movement information of the movable apparatus is recorded, the recorded movement information is converted by coordinate transformation into movement information in a coordinate system of the robot, and the converted movement information is then used to program the robot. This has the advantages of ease of operation, and no restrictions in terms of robot types. Teaching programming is accomplished through simple coordinate system transformation, and there is no need for advanced programming skills.

Optionally, the movable apparatus comprises at least one signal receiver; the recording module is specifically used for determining and recording the first movement information according to a signal received by the at least one signal receiver from at least one signal transmitter; the conversion module is also used for determining the correspondence relationship between the first coordinate system and the second coordinate system according to a relative positional relationship between the at least one signal transmitter and the robot. In this way, the correspondence relationship between the two coordinate systems may be determined according to the position of the deployed signal transmitter; this has the advantages of simplicity, ease of implementation, and flexibility of deployment.

In a third embodiment, a robot teaching programming apparatus is provided, comprising:
  at least one memory, for storing computer-readable code;
  at least one processor, for calling the computer-readable code, and executing the method provided in the first embodiment.

In a fourth embodiment, a computer program product is provided, the computer program product being tangibly stored on a computer-readable medium and comprising a computer-executable instruction which, when executed, causes at least one processor to execute the method provided in the first embodiment.

In a fifth embodiment, a computer-readable medium is provided; a computer-readable instruction is stored on the computer-readable medium, and the computer-readable instruction, when executed by a processor, causes the processor to execute the method provided in the first embodiment.

In a sixth embodiment, a robot teaching programming system is provided, comprising: a movable apparatus, for imitating movement of an end effector of a robot in a working space of the robot; a robot teaching programming apparatus, for recording first movement information, the first movement information being information of movement of the movable apparatus in a first coordinate system; determining second movement information according to a correspondence relationship between the first coordinate system and a second coordinate system, and the first movement information, wherein the second coordinate system is a coordinate system of the robot in the working space, and the second movement information is information of the movable apparatus imitating movement of the end effector of the robot in the second coordinate system; programming the robot according to the second movement information.

A movable apparatus is used to simulate movement of an end effector of a robot, movement information of the movable apparatus is recorded, the recorded movement information is converted by coordinate transformation into movement information in a coordinate system of the robot, and the converted movement information is then used to program the robot. This has the advantages of ease of operation, and no restrictions in terms of robot types. Teaching programming is accomplished through simple coordinate system transformation, and there is no need for advanced programming skills.

Optionally, the movable apparatus comprises at least one signal receiver, and the system further comprises at least one signal transmitter; the robot teaching programming apparatus is specifically used for determining and recording the first movement information according to a signal received by the at least one signal receiver from the at least one signal transmitter; the robot teaching programming apparatus is also used for determining the correspondence relationship between the first coordinate system and the second coordinate system according to a relative positional relationship between the at least one signal transmitter and the robot. In this way, the correspondence relationship between the two coordinate systems may be determined according to the position of the deployed signal transmitter; this has the advantages of simplicity, ease of implementation, and flexibility of deployment.

In each of the above embodiments provided in the present invention, optionally, types of the first movement information and the second movement information comprise at least one of the following information: position information, attitude information, path information, speed information and acceleration information. Precise programming of the robot can be achieved on the basis of the various types of movement information acquired.

The movable apparatus may comprise at least one signal receiver, which receives a signal of at least one signal transmitter, and movement information of the movable apparatus can be determined by means of the signal received by the signal receiver, for example: information such as position, attitude, path, speed and acceleration. With such a method of movement tracking, the entire teaching programming part is not easily affected by the arrangement of teaching programming tools, so the spatial flexibility of teaching programming is high.

Embodiments of the present invention are explained in detail below with reference to the accompanying drawings.

FIG. 1 is a structural schematic diagram of a robot teaching programming system provided in an embodiment of the present invention. As shown in FIG. 1, the system 100 may comprise:

a movable apparatus 20, for imitating movement of an end effector of a robot 30;

a robot teaching programming apparatus 40, for recording information of movement of the movable apparatus 20 in a first coordinate system 101, referred to here as "first movement information"; and determining movement information of the movable apparatus 20 in a second coordinate system 102, referred to here as "second movement information", according to a correspondence relationship between the first coordinate system 101 and the second coordinate system 102, and the first movement information. The second coordinate system 102 is a coordinate system of the robot 30 in a working space, for example: it may be a world coordinate system, a pedestal coordinate system, a workpiece coordinate system, etc.; the robot 30 is then programmed according to the second movement information.

Here, the robot 30 may be a robot 30 which really exists, or a robot simulated by simulation software. As long as the coordinate system of the robot 30, i.e. the "second coordinate system" is fixed, teaching programming of the robot can be performed by means of the solution provided in an embodiment of the present invention.

The first movement information and the second movement information are both used for describing movement of the movable apparatus 20, the difference being that the first movement information describes movement of the movable apparatus 20 with reference to the first coordinate system 101, whereas the second movement information describes movement of the movable apparatus 20 with reference to the second coordinate system 102, i.e. the coordinate system of the robot 30. Based on the correspondence relationship between the first coordinate system 101 and the second coordinate system 102, the second movement information can be obtained from the first movement information, thereby realizing the description of movement of the movable apparatus 20 in the coordinate system of the robot 30, and the movable apparatus 20 is used to imitate movement of the robot 30, therefore teaching of movement of the robot 30 in the working space of the robot 30 is realized, and teaching programming of the robot 30 can thereby be realized according to the second movement information.

Figure 3:
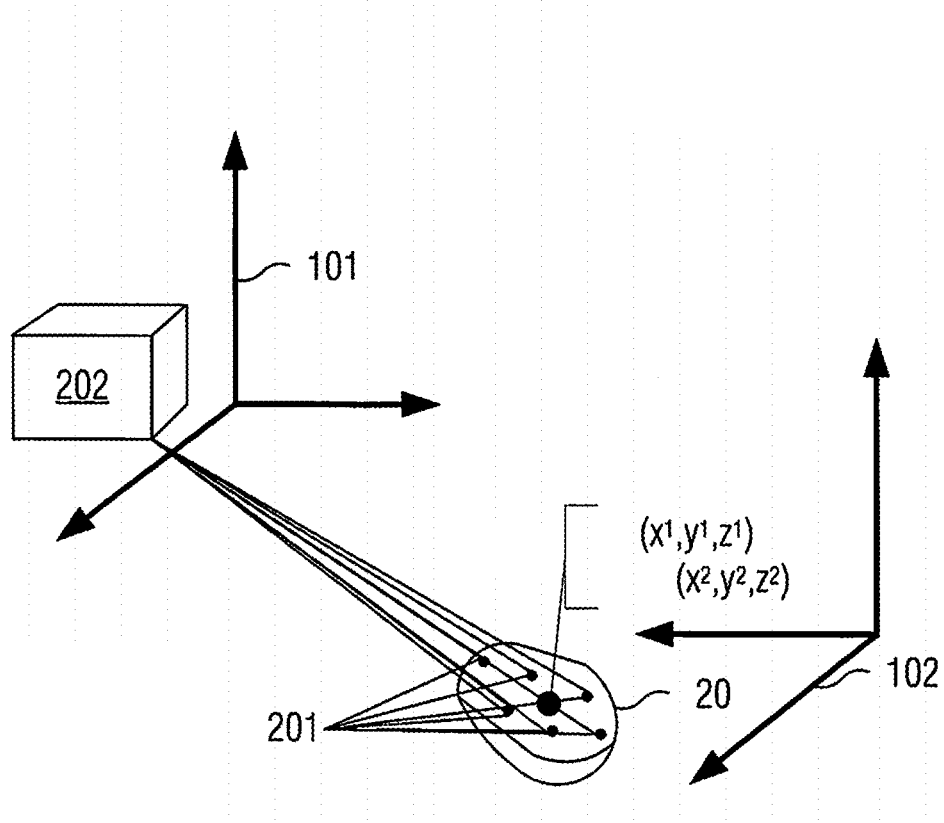
FIG. 3 is a schematic diagram of position teaching in an embodiment of the present invention.
Figure 4:
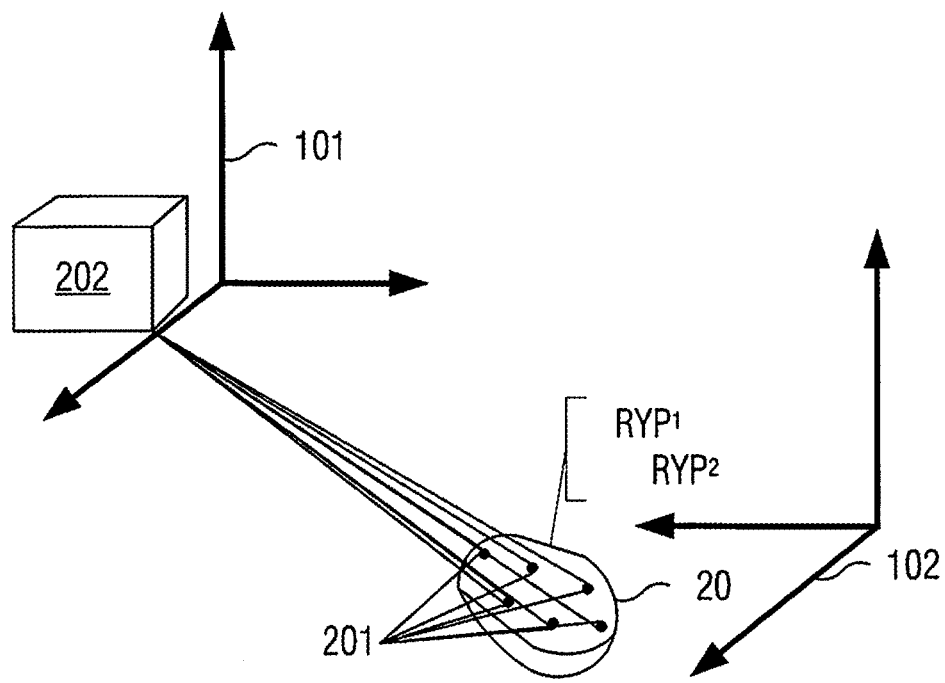
FIG. 4 is a schematic diagram of attitude teaching in an embodiment of the present invention.

The curved lines in FIG. 1 represent paths of movement of the movable apparatus 20. During movement of the movable apparatus 20, the robot teaching programming apparatus 40 may record position information of the movable apparatus 20, (X1, Y1, Z1) as shown in FIG. 3, i.e. position coordinates of the movable apparatus 20 in the first coordinate system 101; (X2, Y2, Z2) are position coordinates of the movable apparatus 20 in the second coordinate system 102 after coordinate transformation. The robot teaching programming apparatus 40 may also record attitude information of the movable apparatus 20, RYP1 as shown in FIG. 4, i.e. an attitude angle of the movable apparatus 20 in the first coordinate system 101; RYP2 is an attitude angle of the movable apparatus 20 in the second coordinate system 102 after coordinate transformation. In addition, the variation of the position of the movable apparatus 20 with time may be used to represent the path of the movable apparatus 20, and the robot teaching programming apparatus 40 may also record path information of the movable apparatus 20. In addition, speed information and acceleration information, etc. of the movable apparatus 20 may also be obtained.

Figure 5:
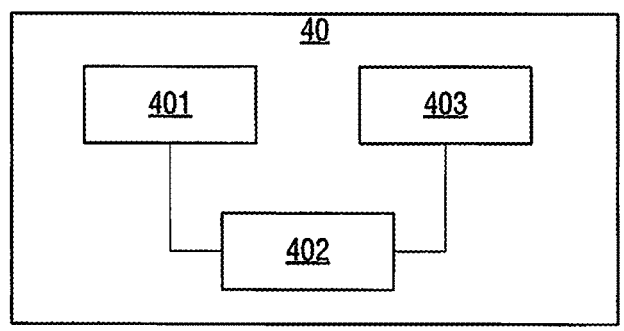
FIG. 5 is a structural schematic diagram of a robot teaching programming apparatus provided in an embodiment of the present invention.

As shown in FIG. 5, in terms of functional implementation, the robot teaching programming apparatus 40 may comprise a recording module 401, for recording the movement information of the movable apparatus 20 in the first coordinate system 101, i.e. the first movement information; a conversion module 402, for converting the first movement information into the second movement information in the second coordinate system 102, i.e. movement information in the coordinate system of the robot 30, according to the correspondence relationship between the first coordinate system 101 and the second coordinate system 102; a programming module 403, for programming the robot 30 according to the second movement information obtained by conversion. In one optional embodiment, the movable apparatus 20 comprises at least one signal receiver 201; the recording module 401 determines and records the first movement information according to a signal of at least one signal transmitter 202 received by the at least one signal receiver 201, and the conversion module 402 may also determine the correspondence relationship between the first coordinate system 101 and the second coordinate system 102 according to a relative positional relationship between the at least one signal transmitter 202 and the robot 30.

Figure 6:
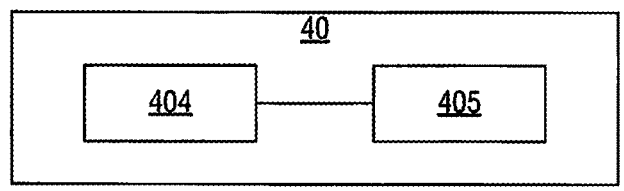
FIG. 6 is another structural schematic diagram of a robot teaching programming apparatus provided in an embodiment of the present invention.

As shown in FIG. 6, in terms of hardware implementation, the robot teaching programming apparatus 40 may comprise at least one memory 404 for storing computer-readable code, and at least one processor 405, for calling the computer-readable code stored on the memory 404, to realize each function of the robot teaching programming apparatus 40. Examples are the functions of each module in FIG. 5. Thus, in terms of implementation, each module shown in FIG. 5 may be a computer program module, stored in the memory 404 as computer-readable code.

In addition, the modules shown in FIG. 5 could also be various functional modules realized by combining hardware and software, or various functional modules realized by hardware alone. Control logic of each process involved in an access control method may be burned into field-programmable gate array (FPGA) chips or complex programmable logic devices (CPLD) etc. in advance, with these chips or devices executing the functions of each hardware module; the particular manner of implementation may be determined according to engineering practice.

When the robot teaching programming apparatus 40 is recording the movement information of the moveable apparatus 20, there are multiple optional manners of implementation. The case shown in FIG. 1, in which at least one signal receiver 201 receives a signal of at least one signal transmitter 202, and the robot teaching programming apparatus 40 determines and records the first movement information according to the received signal, is taken as an example.

The robot teaching programming apparatus 40 may determine the correspondence relationship between the first coordinate system 101 and the second coordinate system 102 according to the relative positional relationship between the at least one signal transmitter 202 and the robot 30. Optionally, at least one transmitter 202 remains stationary as the movable apparatus 20 imitates the movement of the end effector of the robot 30. In this way, it is possible to obtain in advance a fixed coordinate system correspondence relationship before teaching programming.

At least one signal transmitter 202 may record position information of at least one signal receiver 201 at each moment, as shown in FIG. 3, then calculate position information of the moveable apparatus 20 at each moment according to the position information of each signal receiver 201, and then transmit this to the robot teaching programming apparatus 40; the robot teaching programming apparatus 40 can then calculate speed information, acceleration information and path information etc. of the movable apparatus 20 according to the received position information of the movable apparatus 20 at each moment.

Alternatively, at least one signal transmitter 202 may record position information of at least one signal receiver 201 at each moment, and send this directly to the robot teaching programming apparatus 40 without further processing. The robot teaching programming apparatus 40 then further calculates position information, acceleration information, speed information and path information etc. of the movable apparatus 20 at each moment.

Alternatively, at least one signal transmitter 202 may record position information of at least one signal receiver 201 at each moment, as shown in FIG. 4, and due to the fact that a positional relationship among the various signal receivers 201 is fixed and known in advance, at least one signal transmitter 202 can then calculate attitude information of the movable apparatus 20 at each moment according to the position information of each signal receiver 201, and then transmit this to the robot teaching programming apparatus 40; the robot teaching programming apparatus 40 can thus ascertain the attitude information of the movable apparatus 20 at each moment.

Alternatively, at least one signal transmitter 202 may record position information of at least one signal receiver 201 at each moment, and send this directly to the robot teaching programming apparatus 40. Based on the positional relationship, known in advance, among the various signal receivers 201 and the position information of each signal receiver 201 at each moment, the robot teaching programming apparatus 40 then calculates attitude information of the movable apparatus 20 at each moment.

Figure 2:
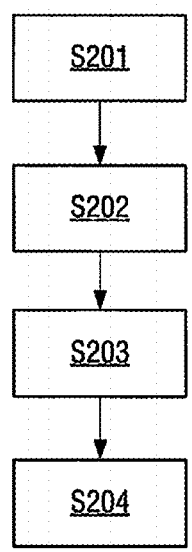
FIG. 2 is a chart of a robot teaching programming method provided in an embodiment of the present invention.

FIG. 2 is a chart of a robot teaching programming method provided in an embodiment of the present invention. The method may be executed by the robot teaching programming apparatus 40. As FIG. 2 shows, the method may comprise the following steps:

S201: determining the correspondence relationship between a first coordinate system 101 and a second coordinate system 102.

As stated above, the robot teaching programming apparatus 40 may determine the correspondence relationship between the first coordinate system 101 and the second coordinate system 102 according to a relative positional relationship between at least one signal transmitter 202 and a robot 30.

S202: recording first movement information of a movable apparatus 20.

As stated above, the robot teaching programming apparatus 40 may acquire information from at least one signal transmitter 202 and determine the first movement information.

S203: performing coordinate transformation, and determining second movement information according to the first movement information.

The robot teaching programming apparatus 40 obtains the second movement information from the first movement information by conversion, according to the correspondence relationship between the first coordinate system 101 and the second coordinate system 102.

S204: programming the robot 30 according to the second movement information.

Having obtained movement information of the movable apparatus 20 in the coordinate system of the robot 30, the robot teaching programming apparatus 40 can subject the robot 30 to teaching programming according to the information.

For other optional embodiments of the method, reference may be made to the descriptions relating to the system 100 above; no further superfluous description is given here.

In addition, the embodiments of the present invention also provide a computer-readable medium, on which is stored a computer-readable instruction which, when executed by a processor, causes the processor to implement a function of the robot teaching programming apparatus 40 in an embodiment of the present invention. Examples of computer-readable media include floppy disks, hard disks, magneto-optical disks, optical disks (such as CD-ROM, CD-R, CD-RW, DVD-ROM, DVD-RAM, DVD-RW, DVD+RW), magnetic tapes, non-volatile memory cards and ROM. Optionally, a computer-readable instruction may be downloaded from a server computer or a cloud via a communication network.

In addition, the embodiments of the present invention also provide a computer program product, which is tangibly stored on a computer-readable medium and comprises a computer-executable instruction which, when executed, causes at least one processor to implement a function of the robot teaching programming apparatus 40 in an embodiment of the present invention.

In summary, the embodiments of the present invention provide a robot teaching programming method, apparatus and system, as well as a computer-readable medium and a computer program product. The present invention has advantages such as ease of operation, high efficiency and low cost.

It must be explained that not all of the steps and modules in the flows and system structure diagrams above are necessary; certain steps or modules may be omitted according to actual requirements. The order in which steps are executed is not fixed, but may be adjusted as required. The system structures described in the embodiments above may be physical structures, and may also be logical structures, i.e. some modules might be realized by the same physical entity, or some modules might be realized by multiple physical entities, or realized jointly by certain components in multiple independent devices.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A robot programming method, comprising:
   recording first movement information, the first movement information being information regarding a movable apparatus imitating movement of an end effector of a robot in a working space of the robot in a first coordinate system, wherein
      the movable apparatus includes at least one signal receiver, and
      the recording first movement information includes determining and recording the first movement information according to a signal received by the at least one signal receiver from at least one signal transmitter, the at least one signal transmitter remaining stationary as the movable apparatus imitates the movement of the end effector of the robot;
   determining a correspondence relationship between the first coordinate system and a second coordinate system according to a relative positional relationship between the at least one signal transmitter and the robot, the second coordinate system being a coordinate system of the robot in the working space;
   determining second movement information according to the correspondence relationship and the first movement information, the second movement information being information regarding the movable apparatus imitating movement of the end effector of the robot in the second coordinate system; and
   programming the robot according to the second movement information.

2. The method of claim 1, wherein types of the first movement information and the second movement information include at least one of:
   position information;
   attitude information;
   path information;
   speed information; or
   acceleration information.

3. A robot teaching programming apparatus, comprising:
   at least one memory configured to store computer-readable code;
   at least one processor connected to the at least one memory, the at least one processor configured to execute the computer-readable code to cause the robot teaching programming apparatus to
      record first movement information, the first movement information being information regarding a movable apparatus imitating movement of an end effector of a robot in a working space of the robot in a first coordinate system, wherein
         the movable apparatus includes at least one signal receiver, and
         the at least one processor is configured to execute the computer-readable code to cause the robot teaching programming apparatus to record the first movement information by determining and recording the first movement information according to a signal received by the at least one signal receiver from at least one signal transmitter, the at least one signal transmitter remaining stationary as the movable apparatus imitates the movement of the end effector of the robot,
      determine a correspondence relationship between the first coordinate system and a second coordinate system according to a relative positional relationship between the at least one signal transmitter and the robot, the second coordinate system being a coordinate system of the robot in the working space,
      determine second movement information according to the correspondence relationship and the first movement information the second movement information being information regarding the movable apparatus imitating movement of the end effector of the robot in the second coordinate system, and
      program the robot according to the second movement information.

4. The robot teaching programming apparatus of claim 3, wherein types of the first movement information and the second movement information include at least one of:
   position information;
   attitude information;
   path information;
   speed information; or
   acceleration information.

5. A robot teaching programming system, comprising:
   a movable apparatus to imitate movement of an end effector of a robot in a working space of the robot, the movable apparatus including at least one signal receiver; and
   a robot teaching programming apparatus to
      determine and record first movement information, according to a signal received by the at least one signal receiver from at least one signal transmitter, the at least one signal transmitter remaining stationary as the movable apparatus imitates the movement of the end effector of the robot, and the first movement information being information regarding movement of the movable apparatus in a first coordinate system, determine a correspondence relationship between the first coordinate system and a second coordinate system according to a relative positional relationship between the at least one signal transmitter and the robot, the second coordinate system being a coordinate system of the robot in the working space, determine second movement information according to the correspondence relationship the second movement information being information regarding the movable apparatus imitating movement of the end effector of the robot in the second coordinate system, and program the robot according to the second movement information.

6. The robot teaching programming system of claim 5, wherein types of the first movement information and the second movement information include at least one of:

position information;
attitude information;
path information;
speed information; or
acceleration information.

* * * * *